United States Patent [19]

De Leebeeck

[11] Patent Number: 5,226,231
[45] Date of Patent: Jul. 13, 1993

[54] PIPE JOINING TOOL

[76] Inventor: Marcel De Leebeeck, 636-61 California Way, Longview, Wash. 98632

[21] Appl. No.: 928,991

[22] Filed: Aug. 12, 1992

[51] Int. Cl.⁵ .............................................. B23P 19/02
[52] U.S. Cl. ........................................................ 29/237
[58] Field of Search ................ 29/237, 238, 267, 282; 269/43; 228/49.3; 254/29 R

[56] References Cited

U.S. PATENT DOCUMENTS

| | | | |
|---|---|---|---|
| 3,281,929 | 11/1966 | Shinnich | 29/237 |
| 3,364,555 | 1/1968 | Swink | 29/237 |
| 3,471,919 | 10/1969 | Evans | 29/237 |
| 3,710,427 | 1/1973 | Doty | 29/237 |
| 4,178,668 | 12/1979 | George | 29/237 |
| 4,519,122 | 5/1985 | Miller | 29/237 |

*Primary Examiner*—Robert C. Watson
*Attorney, Agent, or Firm*—Brian J. Coyne

[57] ABSTRACT

A tool for joining plastic pipe and fittings that provides for a quarter turn rotation of a pipe fitting while simultaneously pulling a free end of a longitudinally aligned pipe section into the fitting. The tool includes an inner ring that slips over a free end of a pipe section and is secured thereto by inwardly directed mounting screws, and an outer ring coaxially circumposed about, and rotatably connected to, the inner ring. A detachable semicircular partial collar fits snugly about the outer ring and reversibly attaches to a pair of outwardly directed nibs positioned on opposite sides of the outer ring in a plane that bisects the pipe section. A crossbar is mounted between a pair of lugs attached to a central portion of the partial collar. A handle is pivotally mounted above a yoke and chain that encircle and grasp the fitting. Drawbars pivotally mounted to a lower end of the handle engage the crossbar so that longitudinal movement of the handle applies a longitudinal force equally to opposite sides of the pipe section, and rotation of the handle causes the fitting to twist about a longitudinal axis.

14 Claims, 7 Drawing Sheets

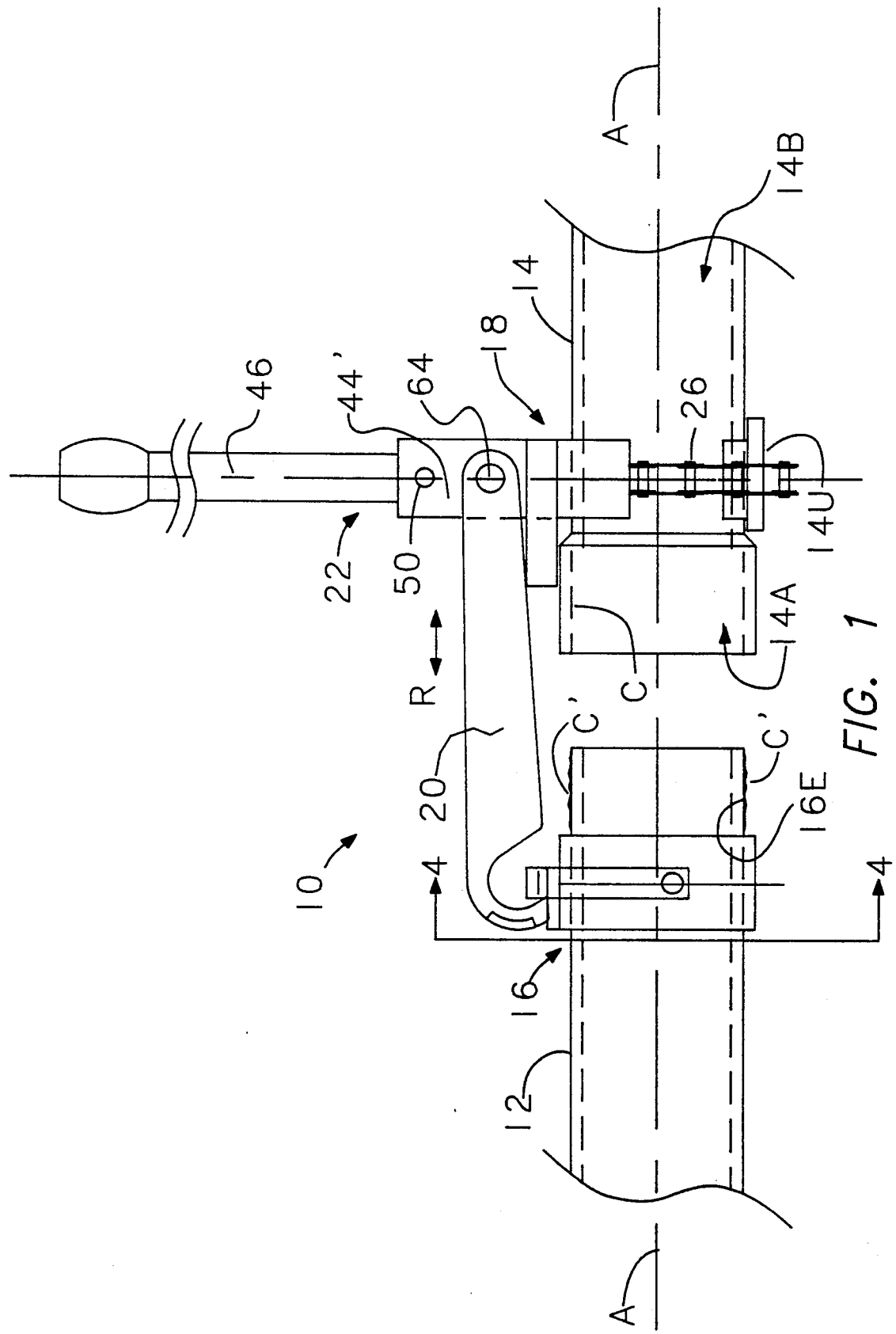

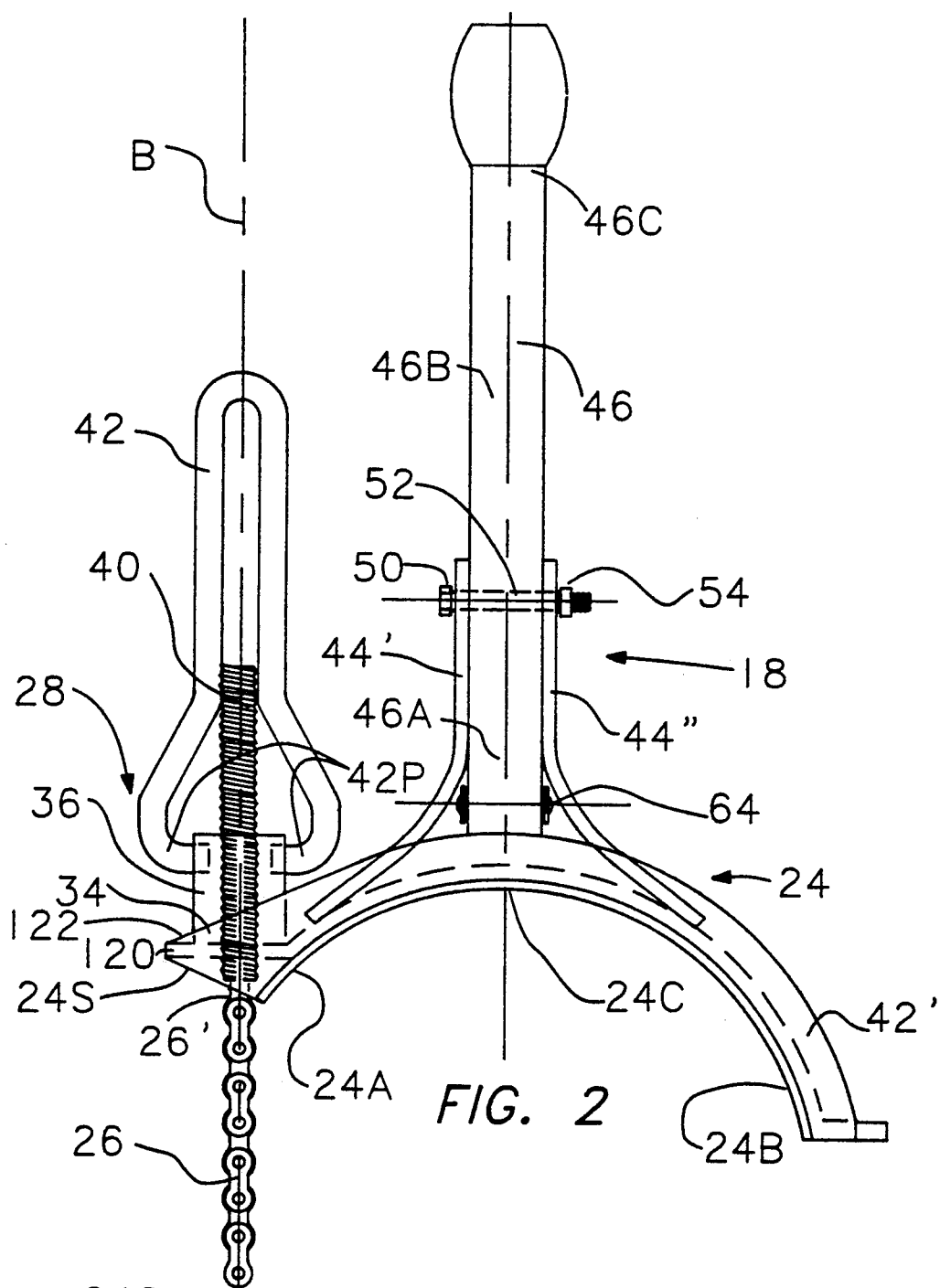
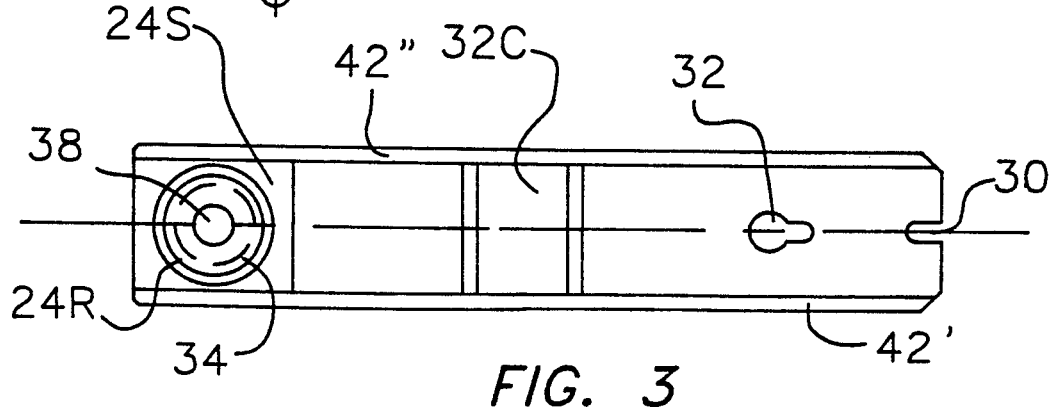

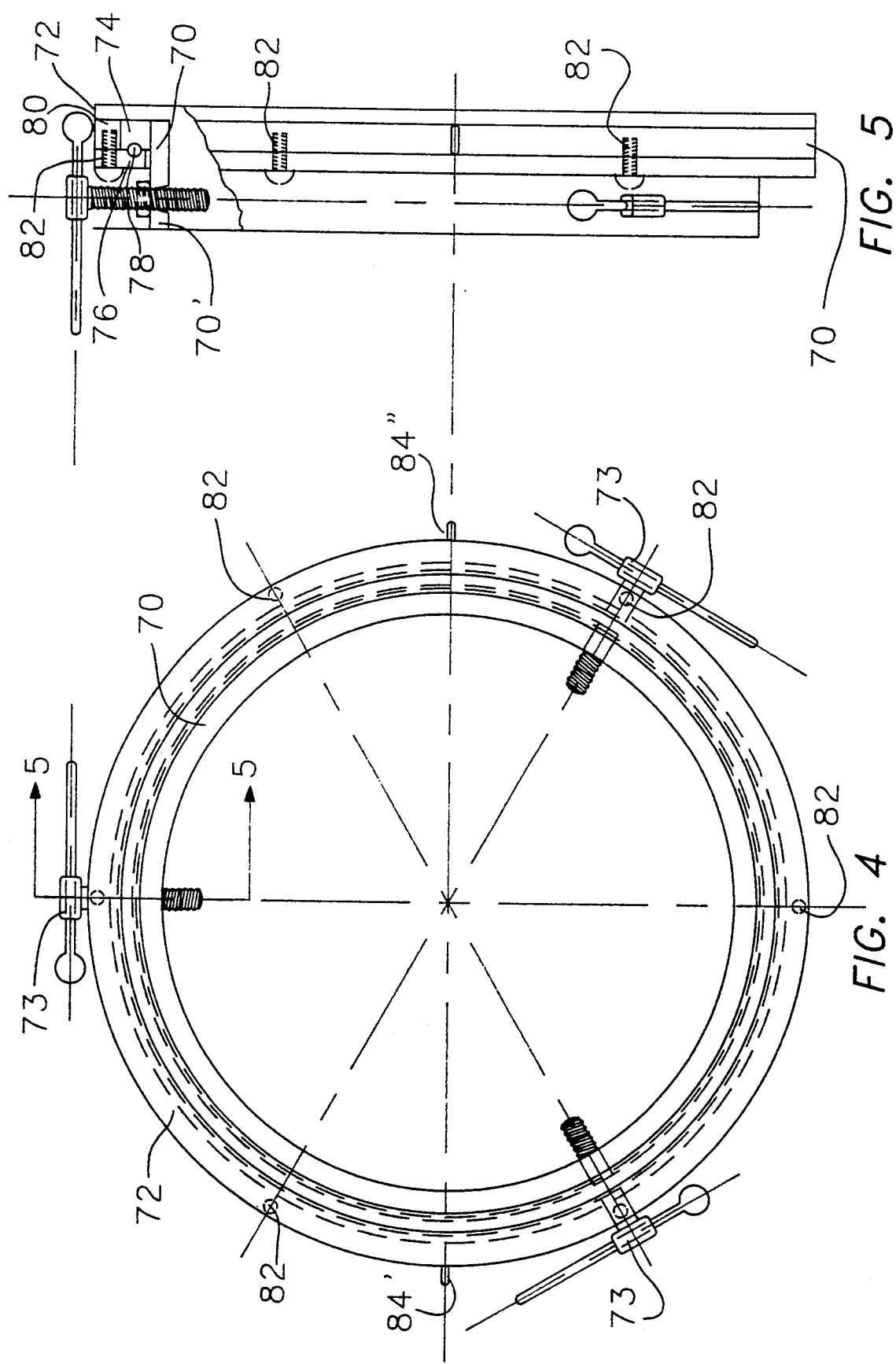

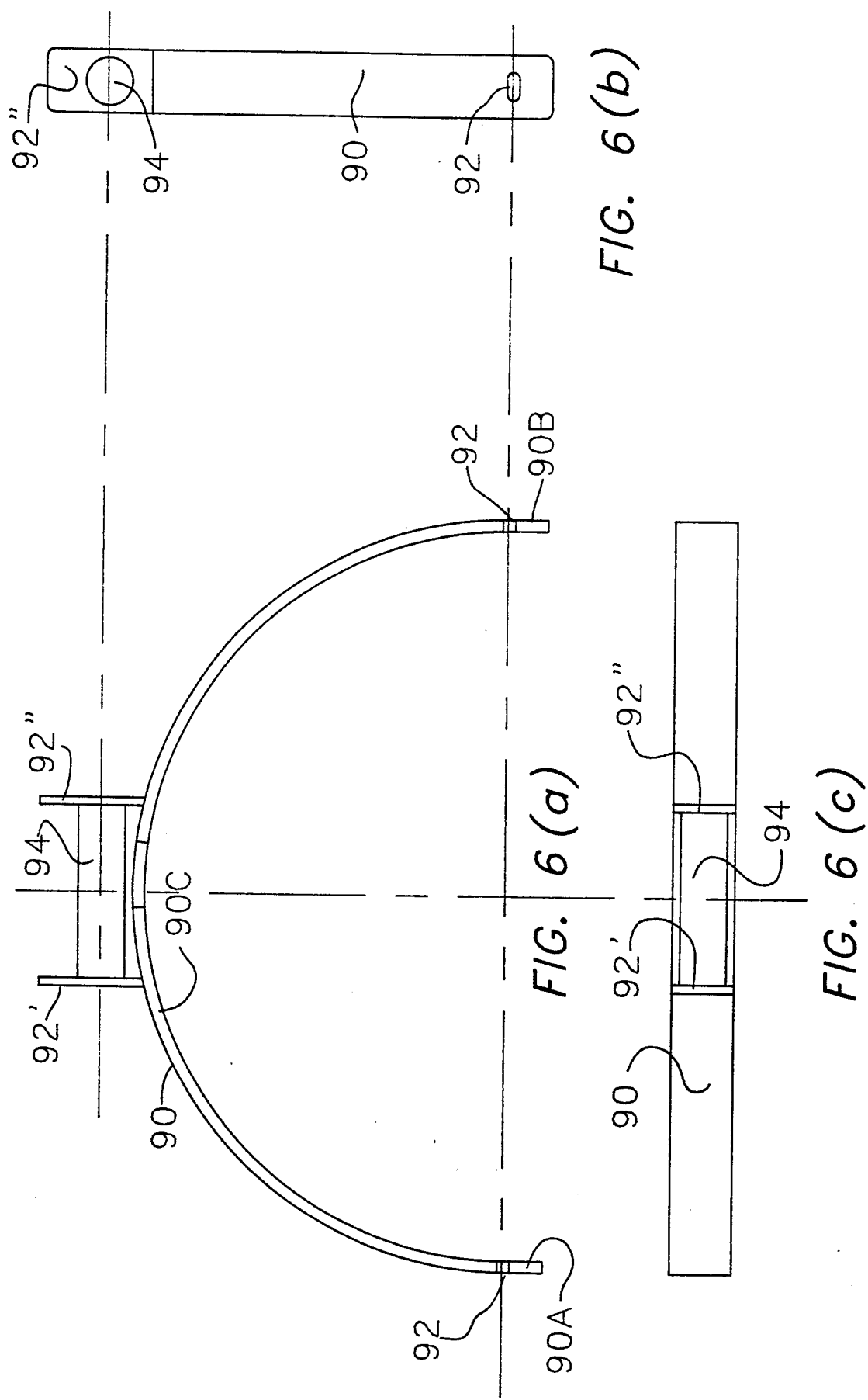

PIPE JOINING TOOL

BACKGROUND OF THE INVENTION

1. Field of the Invention

The present invention relates to pipe joining tools and more specifically to a tool for joining plastic pipe sections to fittings such as a coupling, elbow, tee, 90 or other fitting.

2. Description of the Prior Art

Polyvinyl (PVC) pipe sections are joined one to another by PVC pipe fittings. To join a pipe section to a pipe fitting, a free end of the pipe section is cut square, burrs are removed, the pipe is cleaned, a primer is applied, and PVC plastic pipe cement is applied to the free end of the pipe section and to the inside surface of one socket of the fitting. The fitting and a free end of the pipe section are pulled together to force the pipe section into a socket of the fitting. In order to avoid trapping air in the cement, which results in a weak joint, the fitting should be rotated one quarter turn as the free end of the pipe section enters the fitting socket. Once the free end of a pipe section is inserted into the fitting socket, the joint so formed must remain under compressive force for a period of time to permit the cement to begin to set, generally ranging from thirty seconds to several minutes depending on ambient temperature, diameter of the pipe, and other factors. The procedure can then be repeated using an opposite socket of the same fitting and a free end of another pipe section, thereby joining two pipe sections. If one attempts to perform this procedure by grasping the pipe section in one hand and the fitting in the other hand, and then pushing and holding the fitting and pipe section together, one encounters at least two problems (particularly with larger diameter PVC and CPVC pipe sections, i.e., 6 inches or more): it is difficult to avoid bounce between a pipe section and the fitting into which it is being inserted, and a high degree of sustained compressive force is required to hold the fitting and pipe section together while the cement begins to set.

Manually operable tools have been previously described for pulling and holding together a pipe section and a pipe fitting by compressive force. Illustrative of such tools are the pipe mating tool of Topper, U.S. Pat. No. 4,015,323 (Apr. 5, 1977), the plastic pipe assembly tool of Bjalme, et al., U.S. Pat. No. 3,831,256 (Aug. 27, 1974), and the pipe coupling device of Carter et al, U.S. Pat. No. 3,668,766 (Jun. 13, 1972). Although such tools of the prior art can provide adequate force to hold a free end of a pipe section immobile inside a fitting socket and without bounce, they provide no means for rotating the fitting a quarter turn during the procedure. Moreover, the designers of such tools have generally failed to recognize and provide for the fact that plastic pipe sections are often joined under field conditions, e.g., emplacement in a trench, where mud and debris may be expected to clog moving parts such as hinges, sprockets and gear trains. My invention is directed to a special purpose tool that efficiently performs its intended purpose and without the aforementioned drawbacks.

SUMMARY OF THE INVENTION

The present invention is a tool for joining a pipe section to a pipe fitting by pulling and holding together a pipe section and a pipe fitting, having a fitting engaging assembly for grasping a pipe fitting and a pipe engaging assembly for grasping a pipe section. The pipe engaging assembly preferably includes a horseshoe-shaped fitting yoke for placement on top of the fitting and a link chain wrapped around the underside of the fitting and connected at each end to the fitting yoke. The pipe engaging assembly includes an inner ring and an outer ring circumposed about, and rotatably connected to, the inner ring. The inner ring is of sufficient diameter to slip onto the free end of a pipe section of some maximally desired diameter, for example, up to eight inches. Means are provided for detachably securing the inner ring to pipe sections of various diameters, preferably by three or more inwardly directed mounting screws inserted through the inner ring. A pair of outwardly directed nibs are attached to opposite sides of the outer ring. An equalizing yoke is provided for distributing a longitudinal force equally to opposite sides of a pipe section. The equalizing yoke includes a semicircular partial collar adapted to fit snugly about the outer ring, and having apertures for receiving the nibs of the inner ring, whereby a longitudinal force applied to a central portion of the partial collar is transmitted equally to opposite sides of a pipe section.

Manually operable means is provided for rotating a pipe fitting while simultaneously applying a longitudinal pulling force to a central portion of the partial collar of the equalizing yoke via actuator means. The longitudinal pulling force on a pipe section can be maintained even as the fitting is rotated because the outer ring, which bears against and transmits the longitudinal force to the inner ring, is free to rotate with the fitting.

For a pipe section that has no accessible free end for attaching the rings, a combination pipe engaging and equalizing yoke assembly is provided having a pipe engaging sub-assembly and an equalizing yoke sub-assembly. The pipe engaging sub-assembly includes a first semicircular partial collar portion and a contiguous, coaxial second partial collar portion, for placement on top of a pipe section. A link chain, attached at each end to the second partial collar portion, wraps around the underside of a pipe section. A pair of outwardly directed nibs are attached to opposite sides of the second partial collar portion. The equalizing yoke sub-assembly includes a semicircular partial collar adapted to fit snugly about the first partial collar portion, and having apertures for receiving the nibs of the first partial collar portion, whereby a longitudinal force applied to a central portion of the partial collar is transmitted equally to opposite sides of a pipe section.

OBJECTS OF THE INVENTION

An object of the present invention is to provide a tool specifically designed for plastic pipe.

Another object is to provide a manually operable tool for joining a pipe section to a pipe fitting by pulling and holding a pipe section and a pipe fitting together and without bounce.

Still another object is to provide a tool for joining by cement a pipe section to a pipe fitting that permits a one quarter turn of the pipe fitting to eliminate trapped air from the cement.

A still further object is to provide a tool that can not be easily clogged or rendered inoperable by mud or debris and is sturdy under field use conditions.

Additional objects and advantages of my tool are that it is simple and easy to operate in a shop or at a field location, and it will accommodate pipe sections and fittings over a range of diameters.

Other objects, advantages, and novel features of my invention will become apparent from the following detailed description of my invention when studied in conjunction with the accompanying drawings.

BRIEF DESCRIPTION OF THE DRAWINGS

FIG. 1 is a schematic side elevational view of my tool applied to a pipe section and a pipe fitting.

FIG. 2 is a schematic front elevational view of the fitting engaging assembly and of the means for rotation of the pipe fitting and for reciprocative longitudinal movement of the actuator means.

FIG. 3 is a top plan view of the fitting engaging assembly with the chain tightening means, handle supports and handle removed.

FIG. 4 is a front elevational view of the pipe engaging assembly along line 4—4 of FIG. 1.

FIG. 5 is a cross-sectional view of the pipe engaging assembly taken along line 5—5 of FIG. 4.

FIG. 6(a) is a front elevational view of the semicircular partial collar of the equalizing yoke, lugs and crossbar; FIG. 6(b) is a side elevational view thereof; and FIG. 6(c) is a top plan view thereof.

With reference to FIG. 1, the term "front" shall refer to the left side of longitudinal axis A, and the term "rear" shall refer to the right side of axis A.

DETAILED DESCRIPTION OF THE ILLUSTRATED EMBODIMENT

Figures 7A, 7B:
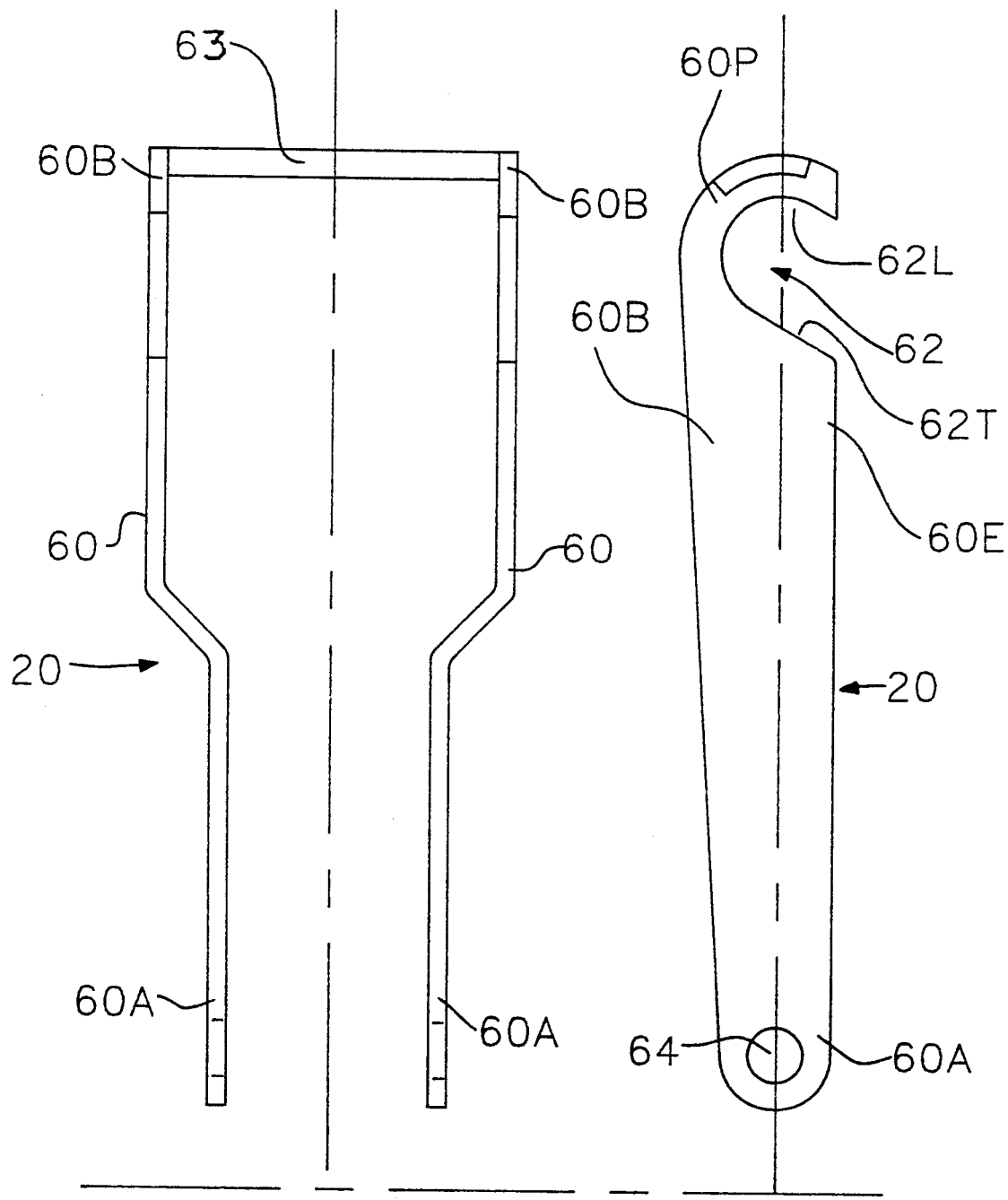
FIG. 7(a) is a top plan view of the actuator means and FIG. 7(b) is a side elevational view thereof.

A pipe joining tool 10, is illustrated in FIG. 1 as applied to a pipe section 12 and pipe fitting 14 oriented along longitudinal axis A. The pipe fitting 14 includes a pair of oppositely directed sockets 14A and 14B. Socket 14A, which faces toward a free end of pipe section 12, contains an internal coat of cement C. Likewise, an end portion 16E of pipe section 16 contains an external coat of cement C'. A pipe engaging assembly, designated generally by the numeral 16, is shown mounted on pipe section 12. A fitting engaging assembly, designated generally by the numeral 18, is shown mounted on the fitting 14. Actuator means, denoted generally by the numeral 20, is shown in an engaged position for transmittal of reciprocative longitudinal force to the pipe engaging assembly 16. Manually operable means, denoted generally by the numeral 22, is attached to the fitting engaging assembly 18 for rotation of the pipe fitting 14 and for reciprocative longitudinal movement of the actuator means 20, as designated by arrows R.

Referring now to FIG. 2, the fitting engaging assembly 18 is shown to include a substantially horseshoe-shaped fitting yoke, designated generally by the numeral 24, for placement over the top of fitting 14. Fitting yoke 24 includes a shortened first, arcuate end portion 24A, which has a shoulder 24S formed by outwardly-directed horizontal plate 120 attached to portion 24A and secured thereto by reinforcing gusset 122. The yoke 24 further includes a longer second, arcuate end portion 24B, and a central portion 24C joining portions 24A and 24B. A first end 26' of first link chain 26 is attached to the first end portion 24A by chain tightening means, designated generally by the numeral 28. Central portion 24 C, as illustrated in FIG. 3, includes slot 30 and keyway 32. Chain 26 is wrapped around the underside 14U of fitting 14 with the opposite end of the chain 26" (not shown) for insertion into either slot 30 for larger diameter fittings or into keyway 32 for smaller diameter fittings.

As may be seen in FIGS. 2 and 3, shoulder 24S has a cylindrical recess 24R forming a seat 34 that serves as a bearing surface for cylindrical nut 36 within recess 24R, and has a vertical bore 38 through the center of recess 24R. The first end 26' of chain 26 is attached to threaded shank 40, which is inserted through bore 38 and in threaded engagement with nut 36. Vertical twist arm 42 has a pair of horizontal, oppositely- directed prongs 42P inserted into recesses disposed on opposite sides of nut 36, whereby twisting of arm 42 about vertical axis B adjusts the tension in chain 26. To better withstand the tension in chain 26, yoke 24 preferably includes a pair of strengthening ribs 42', 42" extending the entire length thereof.

Referring to FIG. 2, the manually operable means 22 includes a pair of horizontally-spaced handle supports 44', 44", having first ends tangentially attached to the fitting yoke 24 and second ends extending outwardly therefrom. An elongated, outwardly directed handle 46 having inward, intermediate, and outward portions, 46A, 46B, and 46C, respectively, is pivotally mounted at an intermediate portion thereof 46B between the second ends of the supports 44', 44" by means of bolt 50 inserted through sleeve 52 and fastened by nut 54.

Referring to FIG. 7, actuator means 20 is shown to include a pair of longitudinally extended, horizontally spaced draw bars 60 each having a first end 60A and a second end 60B. Each draw bar 60 has a hook-shaped, longitudinal projection 60P at the second end 60B thereof formed by cutout 62 from underside edge 60E. The cutout preferably includes a leading semicircular portion 62L and a contiguous trailing portion 62T obliquely angled 30 degrees from vertical. Mounted between the second ends 60B of the draw bars 60 is spacer 63, which maintains the second ends 60B in fixed relation. Each of the draw bars has an aperture 64 at the first end 60A thereof for pivotally mounting the draw bars 60 to the inward portion 46A of handle 46 by pin 64.

Figure 9:
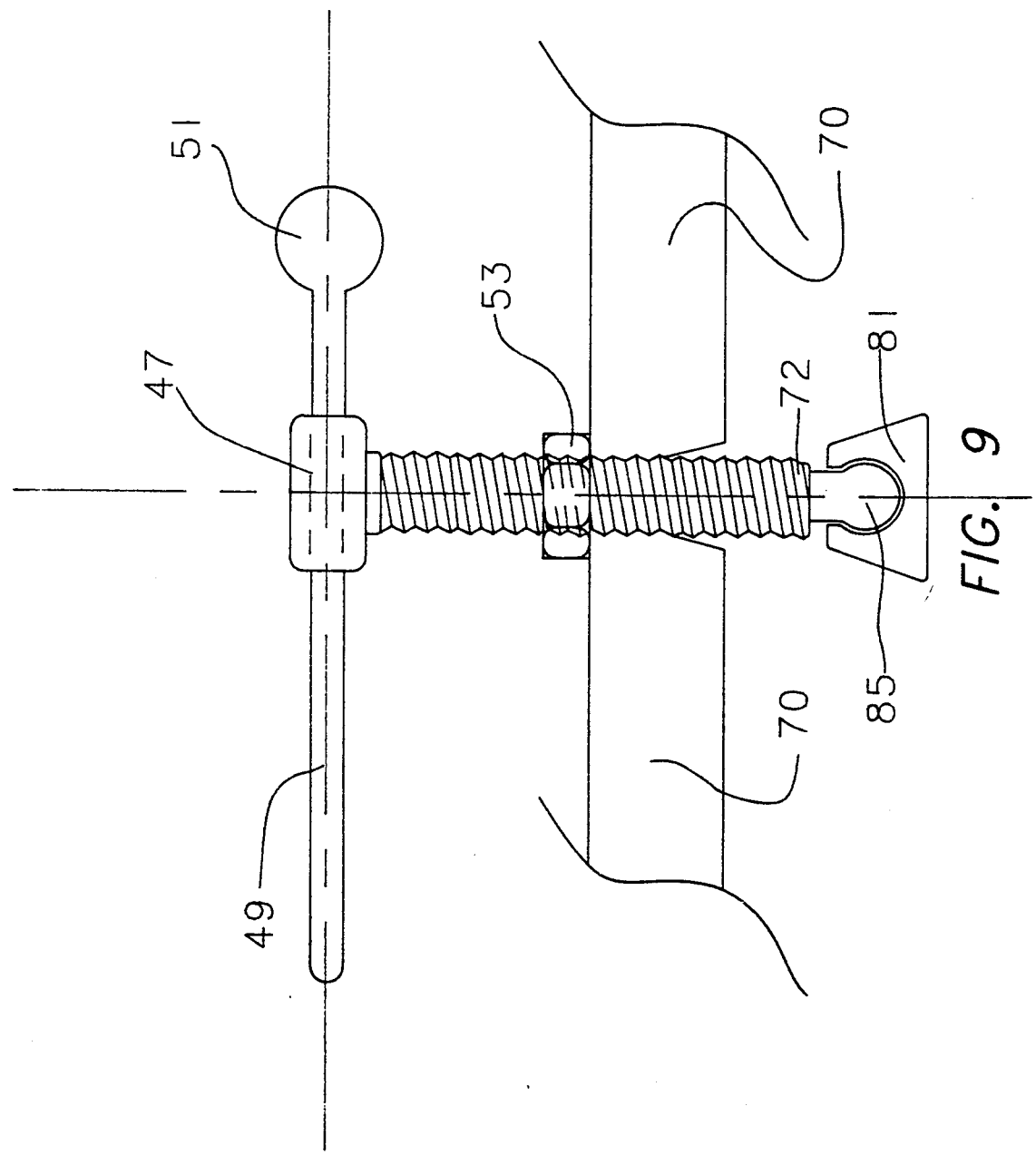
FIG. 9 is an enlarged elevational view of a mounting screw partially inserted through the inner ring.

Referring now to FIG. 4, the pipe engaging assembly is illustrated in front elevational view with the equalizing yoke removed. An inner ring 70 is shown, which should have adequate diameter to receive and surround a free end of a pipe section of some desired maximum size. An outer ring 72 is coaxially circumposed about, and rotatably connected to, the inner ring 70. Referring to FIG. 5, the outer ring 72 includes a rim 80, and at the front edge of rim 80, an inwardly directed circular flange 76 secured to the rim 80 by screws 82, thereby defining a U-shaped channel in cross-sectional view, as may be seen in FIG. 5. Inner ring 70 includes at the rear edge thereof an outwardly directed circular flange 74 positioned in the U-shaped channel defined by outer ring 72, rim 80 and flange 76, and in rotational engagement with flange 76. To reduce friction between the apposing surfaces of the flanges 74, 76, mating semicircular recesses are provided in the apposing surfaces of the flanges 74, 76 as seen in cross-section in FIG. 5, thereby defining a race, and a plurality of ball bearings 78 are distributed around the race. The inner ring 70 is wider than rim 80, thereby providing the inner ring with an exposed marginal disc portion 70' through which three or more inwardly directed mounting screws 73 are mounted at equal intervals and in threaded engagement therewith. Referring to FIG. 9, each mounting screw 73 preferably has an aperture 47 through its head end through which is inserted a sliding bar 49. The sliding bar 49 has a spherical head 51 at one end to prevent the bar from sliding all the way through aperture 47. Screw 73 is stabilized by nut 53 attached to the exterior surface of inner ring 70. Preferably, as shown in FIG. 9, the opposite end of each screw 73 has a bulbous enlargement 85 inserted into a spherical recess of a swivel cap 81 of partial conical section for bearing against the exterior wall of a pipe section. Rotation of the sliding bar 49 causes screw 73 to rotate and cap 81 to advance inwardly into, and to engage an exterior wall of a pipe section. This arrangement avoids marring the surface of a pipe section, as the cap 81 does not rotate once the cap 81 engages a pipe section. Referring again to FIG. 4, a pair of outwardly directed nibs 84', 84", are attached to opposite sides of the outer ring 72 in a horizontal plane that bisects rings 70, 72. The nibs 84', 84" serve as points of attachment for the equalizing yoke 89 as described below.

The equalizing yoke, designated generally by the numeral 89 in FIG. 6, has a thin, semicircular partial collar 90 formed from some resilient material. A first end 90A and a second end 90B of collar 90 each have an aperture 92 adapted to receive the nibs 84', 84" when collar 90 is placed over the top of outer ring 72. The equalizing yoke 89 further includes a pair of horizontally spaced, outwardly directed lugs 92' 92" attached to a central portion 90C of collar 90. A cylindrical crossbar 94 is mounted between the lugs 92', 92".

In use, after the pipe section and pipe fitting have been properly prepared, each with a coat of PVC plastic pipe cement, and aligned along a longitudinal axis A, the fitting yoke 18 is rested on fitting 14, the first link chain 26 is wrapped around the fitting 14, the second end thereof 26" is secured to slot 30 or keyway 32, and the chain 26 is tightened about fitting 14 by twisting arm 42. Rings 70, 72 are slipped over a free end of a pipe section 12 and secured thereto by twisting mounting screws 73. The ends 90A, 90B of partial collar 90 of the equalizing yoke 89 are temporarily spread apart, the collar 90 is positioned over outer ring 70, and collar 90 is permitted to snugly enclose outer ring 72 with nibs 84', 84" inserted through apertures 92. The actuator means 20 is positioned longitudinally with longitudinal projections 60P (see FIG. 7) placed over crossbar 94. The handle 46 is manually rotated about axis A and simultaneously forced rearward, thereby rotating the fitting 14 and pulling a free end of pipe section 12 into socket 14A of fitting 14. The rotation continues until one quarter turn has been completed, and thereafter a rearward directed force is maintained on the handle 46 for sufficient time for the cement to begin to set.

Figure 8:
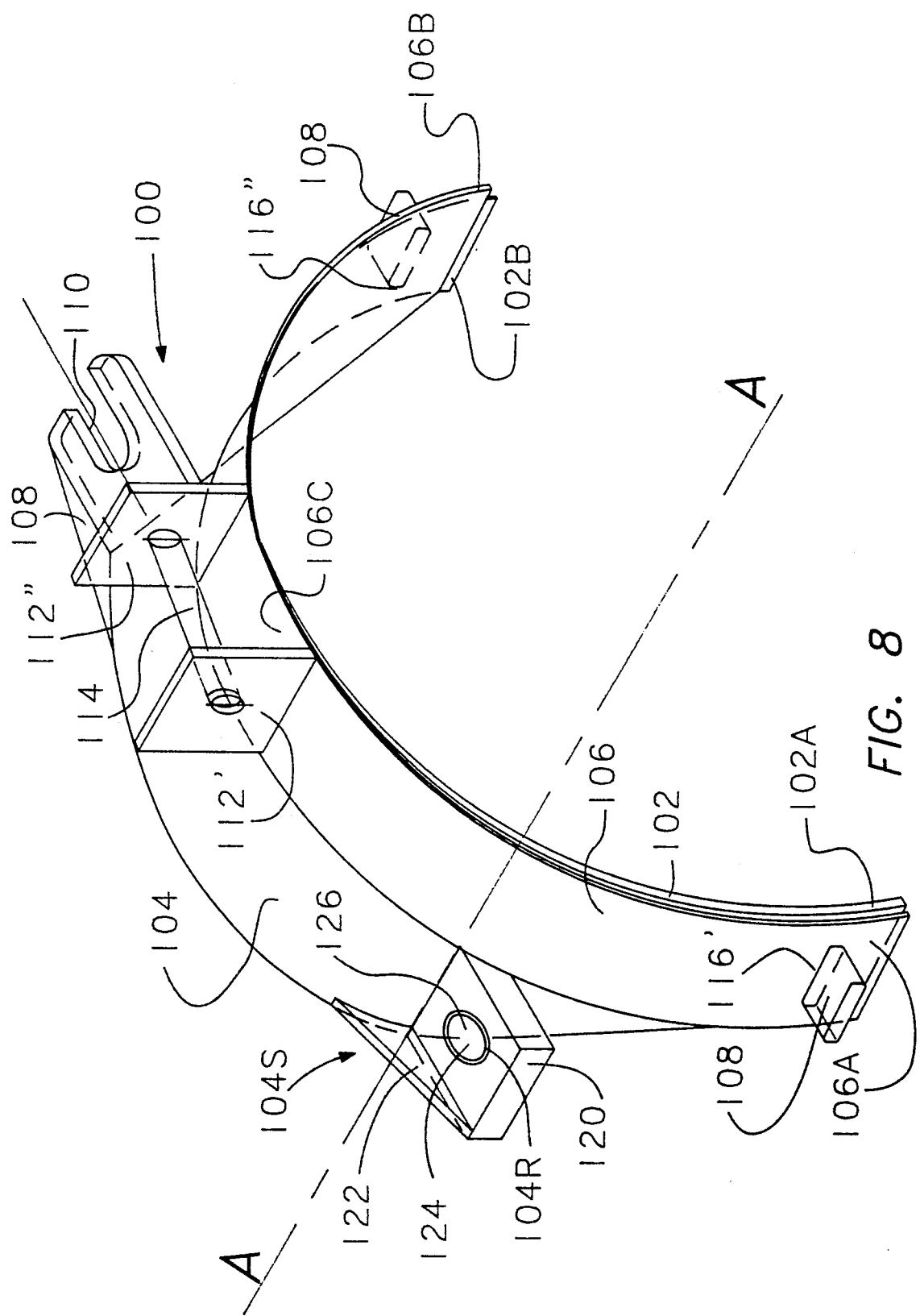
FIG. 8 is a perspective view of a combination pipe engaging and equalizing yoke assembly.

It is not always possible to insert rings 70, 72 over a free end of a pipe section because of the terrain or close working conditions. For such situations, my tool further includes a combination pipe engaging and equalizing yoke assembly, as illustrated in FIG. 8, denoted generally by the numeral 100. This combination 100 is comprised of a pipe engaging sub-assembly and an equalizing yoke sub-assembly. The pipe engaging sub-assembly has a first semicircular partial collar portion 102 and a second semicircular partial collar portion 104 contiguous and coaxial with the first partial collar portion 102 and positioned rearward from portion 102. Whereas the first partial collar portion 102 has squared-off first and second ends 102A, 102B, however, the first and second ends 104A, 104B of the second partial collar portion 104 are rearwardly tapered toward said ends. Ends 102 A, 102B, of partial collar portion 102 each have an outwardly projecting nib 108 that lie in a plane that includes longitudinal axis A. An outwardly-directed, horizontal rectangular plate 120 is attached to one side of the second partial collar portion 104 and secured thereto by reinforcing gusset 122, thereby forming a shoulder 104S. The shoulder 104S has a cylindrical recess 104R forming a seat 126 and a vertical bore 124 through the seat 126 for chain tightening means as previously described herein with reference to FIG. 2. The pipe engaging sub-assembly, therefore, further includes chain tightening means and a second link chain (not shown). On a side opposite from shoulder 104S of collar portion 104 is an outwardly directed projection 108 forming a slot 110 for securing an end of the second link chain.

The equalizing yoke sub-assembly, also illustrated in FIG. 8, includes a detachable, resilient, semicircular partial collar 106 shown snugly overlaying the first partial collar portion 102 of the pipe engaging sub-assembly. Ends 106A, 106B of collar 106 each have an aperture 116', 116" adapted to receive nibs 108. A horizontally-spaced pair of outwardly directed lugs 112', 112", are attached to a central portion 106C of collar 106. A cylindrical crossbar 114 is mounted between the lugs 112', 112". That is, the equalizing yoke sub-assembly of combination 100 is substantially the same as the equalizing yoke 89 illustrated in FIG. 6.

Thus, the combination pipe engaging and equalizing yoke assembly can be used in combination with the previously described fitting engaging assembly, actuator means, and manually operable means attached to the fitting engaging assembly for rotation of the pipe fitting and for reciprocative longitudinal movement of the actuator means.

Various modifications and changes will become obvious to those skilled in the art. Although the tool herein described and illustrated is capable of joining a pipe section to a pipe fitting, it is likewise capable of joining a pipe fitting to another pipe fitting, and the term "pipe section" as used in the appended claims is intended to mean "pipe fitting" in such applications. It is the intent these changes and modifications are to be encompassed within the spirit of the appended claims and that the invention described herein and shown in the accompanying drawings are illustrative only and are not intended to limit the scope of the invention.

I claim:

1. A tool for joining a pipe section to a pipe fitting by pulling and holding the pipe section and pipe fitting together, comprising:
   (A) a fitting engaging assembly for circumferential engagement of the pipe fitting;
   (B) a pipe engaging assembly including:
      1. an inner ring;
      2. an outer ring coaxially circumposed about, and rotatably connected to, the inner ring;
      3. means for attaching the inner ring to the pipe section;
   (C) equilizing yoke including:
      1. a semicircular partial collar having first and second ends and adapted to fit snugly about the outer ring;
      2. a pair of horizontally-spaced, outwardly directed lugs attached to a central portion of the partial collar at points equidistant from the first and second ends thereof;

3. a crossbar mounted between the lugs;

(D) actuator means including 1. a pair of longitudinally extended, horizontally-spaced draw bars having first and second ends, each draw bar having a hook-shaped longitudinal projection at the second end for receiving and engaging the crossbar;

2. a spacer mounted between the projections;

(E) means for detachably connecting the first and second ends of the partial collar to opposite sides of the outer ring; and (F) manually operable means attached to the fitting engaging assembly for rotation of the pipe fitting and for reciprocative longitudinal movement of the actuator means.

2. The tool of claim 1 in which the means for detachably connecting the first and second ends of the partial collar to opposite sides of the outer ring includes a pair of outwardly directed nibs attached to opposite sides of the outer ring and equidistant from the lugs thereof, and wherein the partial collar has an aperture at each of the first and second ends thereof adapted to receive the nibs.

3. The tool of claim 2 in which the inner ring includes an outwardly directed circular flange, and the outer ring includes an inwardly directed circular flange in rotational engagement with the flange of the inner ring, the apposing surfaces of the flange of the outer ring and the flange of the inner ring having circular recesses of semicircular cross-section, thereby defining a race, and a plurality of ball bearings inserted in the race.

4. The tool of claim 3 in which the width of the inner ring is greater than the width of the outer ring thereby providing the inner ring with an exposed marginal disk, and the means for attaching the inner ring to the pipe section includes three or more inwardly directed mounting screws inserted through the exposed marginal disk of the inner ring at equal intervals and in threaded engagement therewith.

5. The tool of claim 2 in which the fitting engaging assembly comprises:

(a) a substantially horseshoe-shaped fitting yoke having first and second arcuate end portions;

(b) a link chain for wrapping around the circumference of the fitting and having a first end and a second end;

(c) chain tightening means attached to the first end of the chain; and (d) means for securing the second end of the chain to the second arcuate end portion of the yoke.

6. The tool of claim 5 in which the first arcuate end portion of the fitting yoke includes a shoulder having a cylindrical recess forming a seat and a bore through the seat, and in which the chain tightening means comprises:

(a) a threaded shank attached to the first end of the chain and inserted through the bore of the seat;

(b) a cylindrical nut mounted in the recess of the first end portion of the yoke and in threaded engagement with the shank, said nut having recesses disposed on opposite sides thereof; and (c) a vertical twist arm having a pair of horizontal, oppositely directed prongs for insertion into the recesses of the cylindrical nut.

7. The tool of claim 1 in which the manually operable means attached to the fitting engaging assembly for rotation of the pipe fitting and for reciprocative longitudinal movement of the actuator means comprises:

(a) a pair of horizontally-spaced handle supports having first ends tangentially attached to the yoke and second ends extending outwardly therefrom;

(b) an elongated, outwardly directed handle having inward, intermediate and outward portions, pivotally mounted at an intermediate portion thereof between the second ends of the supports; and wherein the inward portion of the handle is disposed between the first ends of the draw bars and pivotally mounted to the first ends of the draw bars.

8. A tool for joining a pipe section to a pipe fitting by pulling and holding the pipe section and pipe fitting together, comprising:

(A) a fitting engaging assembly:

(B) a combination pipe engaging and equalizing yoke assembly including:

1. a pipe engaging sub-assembly comprising:

(a) a first semicircular partial collar portion having first and second ends;

(b) a second semicircular partial collar portion contiguous and coaxial to the first partial collar portion, and having tapered first and second ends;

(c) a first link chain for wrapping around the circumference of the pipe section and having a first and second end;

(d) first chain tightening means attached to the first end of the first chain;

(e) means for securing the second end of the first chain to the second end of the second partial collar portion;

2. an equalizing yoke sub-assembly comprising:

(a) a semicircular partial collar having first and second ends and adapted to fit snugly about the first collar portion;

(b) a pair of horizontally-spaced, outwardly-directed lugs attached to a central portion of the partial collar at points equidistant from the first and second ends thereof;

(c) a crossbar mounted between the lugs;

(C) actuator means including:

1. a pair of longitudinally extended, horizontally-spaced draw bars having first and second ends, each draw bar having a hook-shaped longitudinal projection at the second end for receiving and engaging the crossbar;

2. a spacer mounted between the projections;

(D) means for detachably connecting the first and second ends of the partial collar of the equalizing yoke sub-assembly to opposite sides of the first partial collar portion thereof; and (E) manually operable means attached to the fitting engaging assembly for rotation of the fitting and for reciprocative longitudinal movement of the actuator means.

9. The tool of claim 8 in which the manually operable means attached to the fitting engaging assembly for rotation of the fitting and for reciprocative longitudinal movement of the actuator means comprises:

(a) a pair of horizontally-spaced handle supports having first ends tangentially attached to the fitting yoke and second ends extending outwardly therefrom;

(b) an elongated, outwardly-directed handle having inward, intermediate and outer portions, pivotally mounted at an intermediate portion thereof between the second ends of the supports;

wherein the inward portion of the handle is disposed between and pivotally mounted to the first ends of the draw bars.

10. The tool of claim 9 in which the means for detachably connecting the first and second ends of the partial collar to the opposite sides of the first partial collar portion includes a pair of outwardly-directed nibs attached to opposite sides of the first partial collar portion and equidistant from the lugs thereof, and the partial collar has an aperture at each of the first and second ends thereof adapted to receive the nibs.

11. The tool of claim 10 in which the fitting engaging assembly comprises:
 (a) a substantially horseshoe-shaped fitting yoke having first and second end portions;
 (b) a second link chain for wrapping around the circumference of the fitting and having a first and second end;
 (c) second chain tightening means attached to the first end of the second chain; and
 (d) means for securing the second end of the second chain to the second end portion of the fitting yoke.

12. The tool of claim 11 in which the first end of the first partial collar portion of the pipe engaging sub-assembly includes a shoulder having a cylindrical recess forming a seat and a bore through the seat, and in which the first chain tightening means comprises:
 (a) a first threaded shank attached to the first end of the first chain and inserted through the bore of the seat;
 (b) a first cylindrical nut mounted in the recess of the first end of the first partial collar portion and in threaded engagement with the shank, said nut having a pair of recesses disposed on opposite sides thereof; and
 (c) a second twist arm having a pair of horizontal, oppositely-directed prongs for insertion into the recesses of the second nut.

13. The tool of claim 7 further comprising a combination pipe engaging and equalizing yoke assembly including:
 1. a pipe engaging sub-assembly comprising:
  (a) a first semicircular partial collar portion having first and second ends;
  (b) a second semicircular partial collar portion contiguous and coaxial to the first partial collar portion, and having tapered first and second ends;
  (c) a second link chain for wrapping around the circumference of the pipe section and having a first and a second end;
  (d) second chain tightening means attached to the first end of the second chain;
  (e) means for securing the second end of the second chain to the second end of the second partial collar portion; and
 2. an equalizing yoke sub-assembly comprising:
  (a) a second semicircular partial collar having first and second ends and adapted to fit snugly about the first collar portion of the pipe engaging sub-assembly;
  (b) a second pair of horizontally-spaced, outwardly-directed lugs attached to a central portion of the partial collar at points equidistant from the first and second ends thereof; and
  (c) means for detachably connecting the first and second ends of the second partial collar of the equalizing yoke sub-assembly to opposite sides of the first partial collar portion of the pipe engaging sub-assembly.

14. The tool of claim 13 which the means for detachably connecting the first and second ends of the second partial collar of the equalizing yoke sub-assembly to opposite sides of the first partial collar portion of the pipe engaging sub-assembly includes a pair of outwardly-directed nibs attached to opposite sides of said partial collar portion and equidistant from the lugs thereof, and said partial collar has an aperture at each of the first and second ends thereof adapted to receive said nibs.

* * * * *